May 12, 1953  W. A. MELSOM  2,638,361
FLEXIBLE HOSE COUPLING
Filed Jan. 17, 1950  2 Sheets-Sheet 1
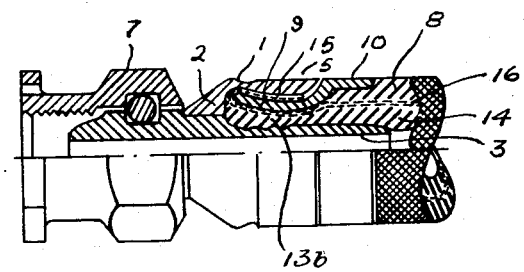
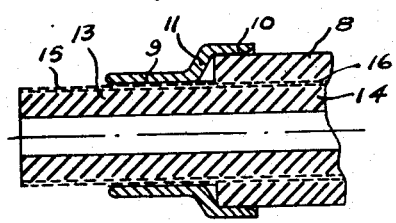  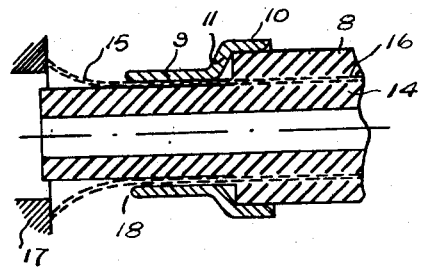
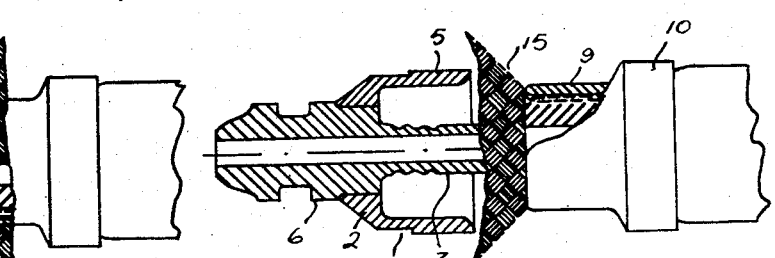
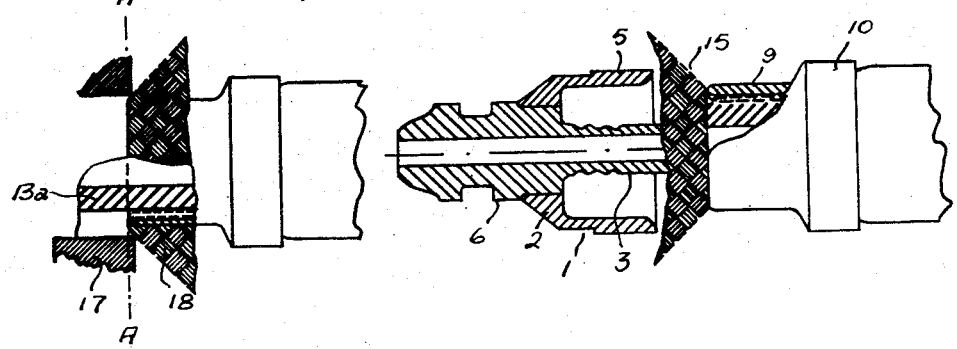
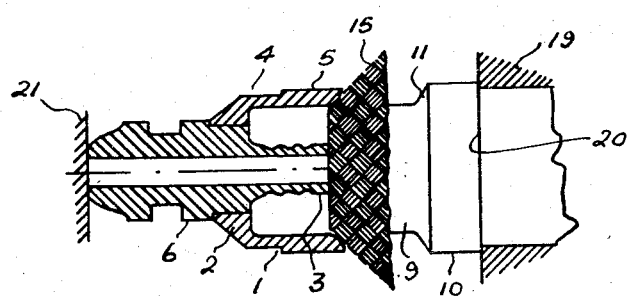
Walter Arthur Melsom Inv
By Albert F. Nathan Atty May 12, 1953   W. A. MELSOM   2,638,361
FLEXIBLE HOSE COUPLING
Filed Jan. 17, 1950   2 Sheets-Sheet 2
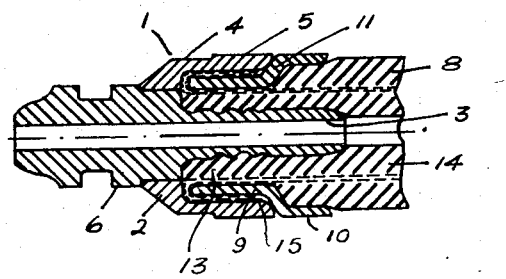
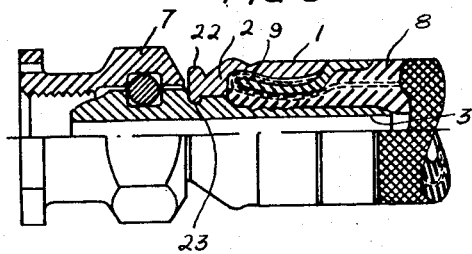
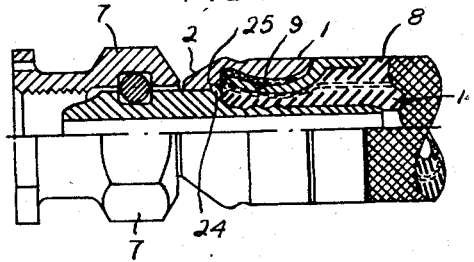
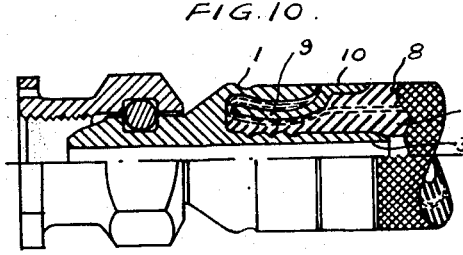
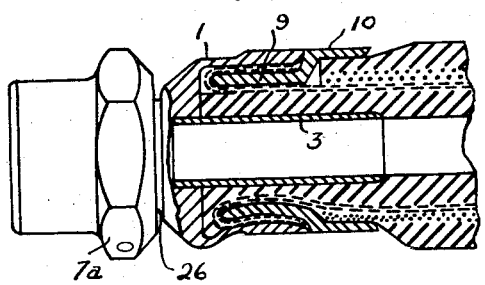

Patented May 12, 1953

2,638,361

UNITED STATES PATENT OFFICE 2,638,361

FLEXIBLE HOSE COUPLING

Walter Arthur Melsom, Wembley, England, assignor to Bowden (Engineers) Limited, London, England Application January 17, 1950, Serial No. 138,968
In Great Britain January 27, 1949

5 Claims. (Cl. 285—84)

The present invention relates to improvements in flexible hose coupling components of the kind employing a flexible hose with inner and outer tubular layers of resilient material such as rubber (natural or synthetic) and a tubular layer of flexible reinforcing material embedded between them, the hose being gripped between a sleeve and an insert, the gripping, in components according to this invention, taking place between a ring surrounding the insert and the sleeve, either directly or through a supplementary ring. The reinforcing material may consist of ribbon-like groups of fine high tensile steel wires braided to tubular form. Except where otherwise mentioned the reinforcing layer is metal, although it may have a fabric covering. The insert must also-cooperate with the sleeve or ring, as the case may be, so that the parts will not separate axially under working conditions. Coupling components having the above features are components "of the kind specified."

With couplings of this kind it is necessary to seal the hose to the coupling sufficiently tightly to prevent the escape of any fluid, and also to grip the hose between the sleeve and insert with sufficient force to prevent any risk of its being blown off axially by internal fluid pressure or by the mechanical separation forces to which the coupling may be subjected in use. The invention is particularly useful for use with high pressure hoses, i. e., hoses subjected to pressures above 500 lbs./sq. inch.

In the specification of my prior Patent No. 2,374,224, I have described and claimed a form of coupling component in which a portion of the hose including or consisting of the inner rubber or like layer and the surrounding reinforcing layer is gripped by contraction of the sleeve so as to form a sealing zone in which the hose is sealed fluid tightly against the insert, and wherein a portion of the reinforcing material lying between such a sealing-zone and the end of the hose is bared of the rubber or like material both externally and internally prior to the contraction of the sleeve and by contraction of the sleeve is powerfully gripped between the sleeve and the insert to form a clamping zone.

An object of the present invention is to construct the coupling to facilitate assembly and to promote effective grip of the bared reinforcing material between deformable members and preferably to enable the coupling to be shortened in length as compared with couplings as aforesaid which, while successful, involve arranging the sealing zone and the clamping zone at different positions along the length of the sleeve, as it were in tandem.

According to the present invention, a flexible hose coupling component of the kind specified is characterized in that the reinforcing layer at its end portion is bare of both outer and inner layers, and in which the inner layer has a portion projecting axially beyond the outer layer, and in which the end portion of the reinforcing layer passes outside a ring situate round the projecting portion of the inner layer, and in which the sleeve has been contracted whereby the end portion of the reinforcing layer is gripped between the sleeve and the ring, and in which the ring has been contracted around the projecting portion of the inner layer to form a sealing zone thereunder.

The grip on the reinforcing layer is obtained by bending it back round the ring before contraction of the sleeve and therefore according to this invention the end portion of the reinforcing layer is bent back around the ring which is situate around the projecting portion of the inner layer and the corresponding portion of the reinforcing layer, and in which the ring has been contracted around the projecting portion of the inner layer and the corresponding portion of the reinforcing layer.

When it is stated that the reinforcing layer is bare, it is intended to include constructions in which there is on the layer a contiguous fabric covering or a layer of rubber so thin that when gripping takes place it is substantially entirely forced into the interstices of the reinforcing layer.

When it is stated that the sleeve and ring are contracted it is meant that they are of such metal and are subjected to such pressure that a permanent deformation is produced. Suitable metals are brass, aluminum alloy, low carbon steel, and Phosphor bronze.

Preferably the contraction of the ring is produced by the operation of contracting the sleeve. The ring around which the reinforcement is folded back and gripped is preferably shouldered and provided with an extension contracted around the outer layer, e. g., so that the sleeve and the ring extension are of the same external diameter, which may correspond to the external diameter of the hose.

The sleeve preferably does not project over the outer layer, and may fit in the shoulder of the ring.

The coupling component according to the invention may be modified by the presence of a supplementary ring contracted between the sleeve and the bare reinforcing material.

Either or each ring or the sleeve may consist of soft metal. The reinforcing material may then be non-metallic because the said material is gripped without damage.

The sleeve may be provided with an external swaging band which may be integral with or separate from the sleeve.

The co-operation of the sleeve or ring and insert may be obtained by the insert bearing on an end wall of the sleeve or ring or by bonding the insert to the sleeve or ring, or by providing the insert with a collar engaging an annular recess in the inner periphery of an opening in the end wall of the sleeve or ring or by contacting a portion of the sleeve or ring into an annular groove in the insert, as in Letters Patent No. 2,310,536. Or it may be obtained by making the sleeve or ring and insert in one piece.

The improved coupling component may be produced by stripping off an end portion of the outer layer, separating an end portion of the inner layer from the reinforcing material, folding and strongly flaring the separated end portion of the reinforcing material, cutting off the free end portion of the inner layer projecting beyond the fold, and with the ring in position for contracting and bearing against a fixed abutment, displacing the sleeve axially in order to fold the flared reinforcing material inwards around and in close proximity to the ring and simultaneously inserting the insert into the hose, and finally swaging the sleeve and the ring in one operation. The reinforcing material may be folded back around the ring, by means of a ring tool. This tool is removed; whereupon the reinforcing material folds back but remains in a strongly flared condition for closure round the ring by the sleeve. The said axial displacement of the sleeve may be effected by the ram of a press.

Considerable development work has taken place in recent years on the construction of high pressure reinforced flexible hose and in some cases it has been found desirable to make the outer layer of softer compounds than those used in the constitution of the inner layer.

The use of a softer outer layer has introduced difficulty in preparing coupling components in which the pressure applied when contracting the sleeve is transferred through the medium of the said layer to the inner layer. In such cases it is necessary that the resistance to flow under the contracting pressure offered by the outer layer should not vary very much from that offered by the inner layer. This condition does not obtain in the recently developed hoses above referred to and the improved coupling component according to the present invention is particularly suited for such hoses since the contracting pressure is not transmitted through the outer layer, but this will have been removed where the hose is mainly gripped.

Constructional forms of coupling components made according to the present invention will now be described more in detail with reference to the accompanying drawings, in which:

Fig. 1 is a sectional elevation of a preferred form of coupling component, according to the invention. Figs. 2 to 7 show various phases in preparing this coupling component for swaging. Figs. 8, 9 and 10 show half in section and half externally views of three modified forms of coupling component according to the invention. Fig. 11 is a sectional elevation of a further form of coupling component according to the invention, the upper half of the view showing the parts before contraction and the lower half after contraction.

In the form shown completed in Fig. 1 and in various stages of assembly in Figs. 2 to 7, the metal sleeve 1 has an apertured end wall 2 into which the tubular insert 3 is permanently attached by silver soldering, copper brazing or other suitable means to obtain the co-operation between the sleeve and insert. The peripheral or cylindrical wall 4 of the sleeve which is intended to be contracted round the hose is preferably provided with an external swaging band 5 which may be integral with the sleeve, as shown, or a separate band.

The insert is adapted for coupling the component to the external part of the coupling and for this purpose it is provided with a projection 6 extending from its outer end (i. e., that opposite to the hose) which projection may be a sealing nipple adapted rotatably to support a union nut 7, e. g., as described and claimed in Patent No. 2,310,490, or the projection may be provided with a male or female screw.

The end portion of the outer rubber layer 8 of the hose is stripped off and a contractible metal ring 9 is slid over the so-stripped portion of the hose and such ring is outwardly shouldered at 11 and provided with an extension 10 of sufficient diameter to fit round the end portion of the outer layer 8 of the hose (which layer may be externally ground down). The shoulder 11 on the ring serves as an abutment for the end of the outer layer and for the sleeve. The end portion 13 of the inner rubber layer 14 and the end portion 15 of the wire braiding 16 forming the reinforcing layer are separated from one another from the end of the hose sufficiently towards the end of the outer layer as to enable the metal braiding to be flared outwards (Fig. 3). A ring tool 17 is brought into contact with the flared reinforcing material and is axially displaced to fold the metal braiding on the rounded end 18 of the ring 9 and force the said material around the outside of the ring (Fig. 4). This operation leaves an extreme end portion 13a of the inner tubular layer projecting beyond the end of the braiding, and the operator cuts this off, e. g., flush with the fold at line A, Fig. 4. The ring tool is then removed and the wire braiding recovers to a position as indicated in Fig. 5.

The sleeve and attached insert are then assembled to the hose as shown by Fig. 6 and the assembly is then mounted into an arbor press having a split reaction plate 19 fitted over the hose against the end edge 20 of the ring extension 10, the ram 21 of the press being brought into contact with an appropriate portion of the insert, e. g., the end of the projecting nipple 6, and a thrust applied thereto which draws the braiding into place round the ring 9 and makes the whole assembly ready (Fig. 7) for contraction by swaging of the sleeve. As a result of this contraction the folded back end portion of the wire braiding lying around the ring is securely gripped between the sleeve and the said ring and the latter is deformed inwardly around the portion 13b of the inner layer projecting beyond the end of the outer layer and seals the inner layer to the insert (Fig. 1).

The rubber of the inner layer displaced towards the end of the sleeve will be forced round the folded end of the reinforcing material to fill up any cavity left in the inner end of the sleeve.

The extension 10 of the ring may be contracted at the same time and to the same extent externally as the sleeve around the end portions of the outer layer. The sleeve and extension have the same external diameter in the finished coupling, which diameter as shown may be the external diameter of the hose.

Where the hose has a contiguous layer or layers of braided or other fabric reinforcing material, this is preferably removed where the wire braiding is to be directly gripped between the sleeve and the ring or, if a supplementary ring is provided between the sleeve and the reinforcement, between the rings, but it may be left and gripped with the wire braiding. Similarly a thin layer of the resilient material may be left, provided it is so thin that it will be substantially entirely forced into the interstices of the reinforcing layer.

In the form shown in Fig. 8, the co-operation between the sleeve and insert is obtained by providing the end wall 2 of the sleeve with a swaging band 22, which is swaged in to fill an external annular groove 23 in the insert.

In the form shown in Fig. 9, the co-operation between the sleeve and insert is obtained by a collar 24 on the insert engaging an internal annular recess 25 in the end wall 2 of the sleeve. No brazing or swaging is in this case necessary.

In each of the forms described the insert projects through the end wall of the sleeve and is constructed for coupling the component to a companion coupling component.

In the form shown in Fig. 10, the co-operation between the sleeve and the insert is obtained by making the sleeve and the insert in one piece.

In the form shown in Fig. 11 the insert is permanently attached as by copper brazing or silver soldering in the end wall of the sleeve and the sleeve is provided with a projection 26 adapted for coupling the component to a companion coupling component, e. g., by way of a nut 7a which may be mounted on the projection of the sleeve. Alternatively a separate nipple, screw or other coupling component may be fitted to such wall, e. g., in an aperture therein, and the wall may be of hemispherical or other part spherical form to receive one or more such connecting components, as described and claimed in my specification No. 2,477,193.

If the hose has two or more layers of wire braiding separated by an intervening layer or layers of rubber materials the outer rubber layer may be cut away and the outer tubular layer of wire braiding directly gripped between the ring and the sleeve or supplementary ring, or the outer layer or layers of wire braiding may be cut away with the outer rubber layer and such intervening layer or layers and the remaining layer of wire braiding directly gripped, or two or more of the reinforcing layers may be gripped in contiguity.

Where in the following claims I refer to the end portion of the reinforcing material being gripped between the sleeve and ring members, it is to be understood that this grip is not essentially direct but that a supplementary ring may be interposed between the reinforcing material and the sleeve. Further, where in the following claims I refer to the reinforcing material this is to be understood to be of metal except where it is expressly stated to be non-metallic, although it may have a fabric covering.

What I claim is:

1. A flexible hose coupling component comprising a flexible hose with inner and outer tubular layers of resilient material and a tubular layer of flexible reinforcing material embedded between them, a sleeve member and an insert member held to the sleeve member against axial movement relative thereto out of the hose and a separate ring member, the said layer of reinforcing material at its end portion being bare of both outer and inner layers of resilient material, said inner layer having a portion projecting axially beyond the outer layer, said end portion of the reinforcing layer being bent back around the ring member which is situated around the projecting portion of the inner layer and the corresponding portion of the reinforcing layer, and in which said sleeve member situate round the ring member has been contracted whereby the end portion of the reinforcing layer is gripped between the sleeve and ring members and said ring member has been contracted around the projecting portion of the inner layer and the corresponding portion of the reinforcing layer to form a sealing zone thereunder.

2. A flexible hose coupling component according to claim 1, in which the ring is shouldered and has an extension that surrounds the said outer layer and said contracted sleeve member is arranged in the recess formed by said shoulder and the bent back end portion of the reinforcing material.

3. A flexible hose coupling component comprising a flexible hose with tubular layers of resilient material and tubular reinforcing material embedded between said layers, a sleeve member, and a tubular insert member and a separate ring member, said sleeve and insert members forming an annular recess with a closure wall at one end, an end portion of said reinforcing material being bare of resilient material both externally and internally, said inner layer having a portion projecting axially beyond the outer layer into said recess, said end portion of the reinforcing material being bent back around the ring member which is situated in said recess around the projecting portion of the inner layer and the corresponding portion of the reinforcing layer, said inner layer terminating adjacent the bend of said reinforcing material and the said closure wall, and in which said sleeve member situate round the ring member has been contracted whereby the end portion of the reinforcing layers is gripped between the sleeve and ring members and said ring member has been contracted around the projecting portion of the inner layer and the said corresponding portion of the reinforcing layer to form a sealing zone thereunder.

4. A flexible hose coupling component comprising a flexible hose with tubular layers of resilient material and tubular reinforcing material embedded between said layers, a contracted outer annular gripping member and a tubular insert intruding into the bore of the hose and held to the said outer member against movement relative thereto axially out of the hose, and a contracted separate annular intermediate gripping member, a bent back end portion of said reinforcing material internally and externally bare of the resilient material being gripped between said contracted members and another portion of the reinforcing material and a portion of the resilient material underlying the said contracted intermediate member and being gripped between it and the said insert to form a sealing zone.

5. A flexible hose coupling component according to claim 4, in which the reinforcing material, gripped between the sleeve and ring members, is non-metallic and at least one of the members gripping it has at least the part engaging it of soft metal so that the reinforcing material is gripped without damage.

WALTER ARTHUR MELSOM.

References Cited in the file of this patent

UNITED STATES PATENTS

| Number | Name | Date |
|---|---|---|
| 2,150,471 | Van Vulpen | Mar. 14, 1939 |
| 2,374,226 | Melsom | Apr. 24, 1945 |
| 2,384,635 | Melsom | Sept. 11, 1945 |
| 2,428,189 | Wolfram | Sept. 30, 1947 |
| 2,463,293 | Mentel | Mar. 1, 1949 |
| 2,473,441 | Muller | June 14, 1949 |
| 2,550,583 | Millar | Apr. 24, 1951 |